A. DE BEVOISE & F. A. LUCKENBACH.
Process for Steaming and Drying Grain.
No. 205,606. Patented July 2, 1878.
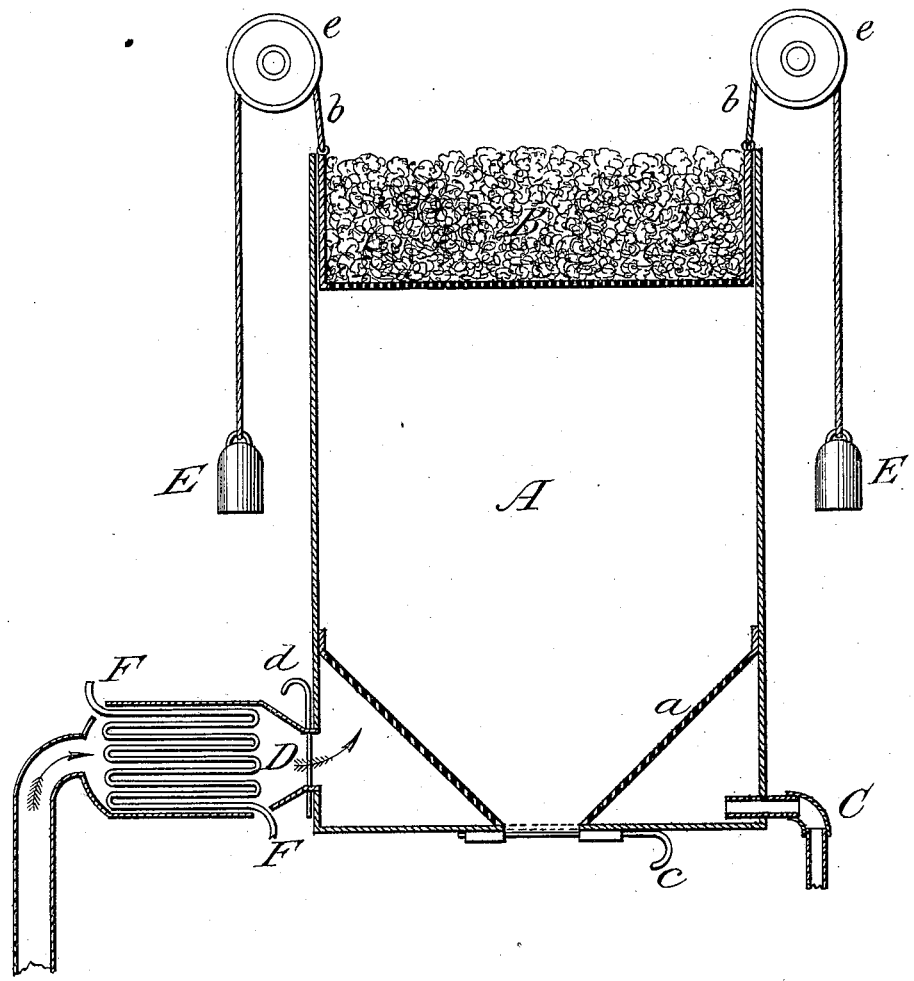
Attest:
H. Luckenbach
Henry Bailey
Inventor.
A De Bevoise
F. A. Luckenbach

UNITED STATES PATENT OFFICE.

ABRAHAM DE BEVOISE, OF BROOKLYN, AND FREDERIC A. LUCKENBACH, OF NEW YORK, ASSIGNORS TO JOHN E. MULFORD, OF NEW YORK, N. Y.

IMPROVEMENT IN PROCESSES FOR STEAMING AND DRYING GRAIN.

Specification forming part of Letters Patent No. 205,606, dated July 2, 1878; application filed January 9, 1878.

*To all whom it may concern:*

Be it known that we, ABRAHAM DE BEVOISE, of the city of Brooklyn, in the county of Kings and State of New York, and FREDERIC A. LUCKENBACH, of the city, county, and State of New York, have jointly invented certain new and useful Improvements in Processes and Apparatus for Drying and Curing Grain and similar substances, of which the following is a full, clear, and exact description, reference being had to the accompanying drawing, and to the letters of reference marked thereon.

The drawing represents an axial section of an apparatus involving the principles of our invention, and capable of permitting the employment of our improved process.

The principal feature of the invention, to be hereinafter described, involves the use of an absorbent material, which will take up, absorb, or hold in suspension the surplus moisture resulting from condensation of the steam after it has passed through the grain or substance being dried or cured. The advantages to be derived from the use of the absorbent material, for the purpose stated, arise from the fact that the moisture from the condensed steam is taken up and rapidly absorbed by the material, thus preventing this moisture from returning to the tank and being absorbed by the heated grain, which would prove detrimental to the perfect accomplishment of the desired purposes.

When the steaming part of our process is completed, the grain being treated will be in the best possible condition to receive the heated and cool air currents required to complete the perfect drying of the mass.

The materials most suitable for use as absorbents are sponge, wool, wood, sawdust, &c.; but any material possessing similar qualities may be found useful.

In carrying out our invention we place grain, such as Indian corn or the like, in a chamber, A, said chamber being suitably constructed for receiving, holding, and discharging the material. The base of the chamber or funnel *a* is perforated, to allow the steam and air currents to pass through it and up through the mass; and it is also provided with a valve, C, which controls the discharge-opening.

The absorbent material is placed in a perforated receptacle, B, which may be twelve or more inches in depth, and so located as to cover the steam and air exit above the grain in the tank. This receptacle is preferably suspended by ropes or chains running over pulleys and counterbalanced by weights, so that it may be easily withdrawn from the opening and replaced at the will of the operator.

A steam-pipe, C, leads from a suitable steam-boiler, and communicates with a chamber beneath the grain-support, said pipe being, of course, provided with a properly-constructed valve.

At D is shown an air-heating contrivance, located conveniently with respect to the tank A. This should preferably be arranged to supply a volume of heated air without admixture therewith of any of the products of combustion arising from the fuel used. Any approved form of hot-air furnace suitable for the purpose may be adopted. By use of that shown at D the desired purity of air may be insured by passing steam, water, air, or other heat-conducting fluid through the coiled pipe F, which has no opening within the air-heater.

A valve, as at *d*, controls admission of air to the chamber beneath the grain-support, with which chamber the air-pipes are connected.

The apparatus being constructed and arranged substantially in accordance with the foregoing, it is operated as follows: The tank A is charged with grain, and the absorbent receptacle, with its contents, placed in proper location to cover the steam-discharge opening leading out of the tank. Dry live steam, under a pressure of about sixty pounds or more to the square inch, is then admitted through the steam-pipe C, and this forces itself into and through the grain and out through the absorbent material, which latter holds the surplus condensed steam in suspension and prevents its contact with the grain. The grain is thus prevented from absorbing a surplus of moisture, in consequence of which it is in the best condition to be favorably affected by the heat from the steam. Should the steam-outlet be left uncovered, as is customary in previous forms of grain-driers, the steam would condense immediately upon coming in contact with the atmosphere, and this condensed moisture would return to the grain-tank. If, then, the hot blast be applied to the moist grain (as has heretofore been done after steaming in an open-top receptacle) the grain will, by reason of the presence of this moisture, become cooked and unfit for making bread, &c. By use of the absorbent material we avoid this return of condensed steam to the grain-tank, and we are thus enabled to produce an article, after following out the remaining steps of the process, possessing certain characteristics not discoverable in similar articles treated by any other process of steaming and drying as heretofore practiced. After the steaming is completed, which usually requires from twenty to fifty minutes' time, the steam-current is turned off, and a current of air, heated, say, to about 170° Fahrenheit, is forced into and through the grain.

During the continuation of the air-blast the receptacle D may be removed from the opening which it covers, so that the egress for the air will not be unnecessarily impeded. By use of this heated air-blast all the moisture in the mass of grain is carried off; but the grain is still left in a heated condition. To cool it, a similar current of cool air is forced into and through the mass, by reason of which the grain is restored to the atmospheric temperature, and is left in proper condition to be immediately stored or otherwise disposed.

The process, as above explained, destroys the germ of the grain, removes all must and ordinary substances like dust and dirt, arrests decay, prevents the growth of fungus, and leaves sound grain with its natural appearance and color, without the destruction of any of its properties for food. After treatment the grain is not liable to mold, to heat, or to grow, and may be stored or transported without danger of damage from any of the ordinary causes.

The process is specially advantageous in the treatment of Indian corn, because of the extreme liability of this article to damage from natural causes when stored in bulk; but the process may, obviously, be applied to any other grain or seed as well.

We are fully aware of numerous previously-invented processes for cooking, drying, &c., involving the application of steam-heat, either directly or indirectly, to the grain, the application of heated air, and also the application of cool air; and we are also aware of several patented driers wherein the grain is allowed to fall slowly through a volume of air, necessitating frequent and uneconomical handling or moving of the mass of grain.

We are further aware of the previous application of a porous absorbent material in the tops of lumber and pottery kilns, which are not constructed for the purpose of drying grains and similar articles, nor capable of permitting the carrying out of our process, but in which the absorbent operates to prevent return of condensed steam to the kiln. To such processes and apparatus we therefore desire it understood that we make no claim.

The apparatus herein illustrated is capable of use in carrying out a process different from the one herein intended to be covered, which process is made the subject of a separate application for patent.

Having thus fully described our invention, what we claim as new, and desire to secure by Letters Patent, is—

1. In the drying and curing of grain and similar materials, the process which consists in passing steam through the mass and then into and through an absorbent material constituting a porous cover to the outlet of the drying-chamber, and adapted to hold in suspension any condensation of steam passing through the same, and finally drying the grain by the application of dry heat, substantially as specified.

2. The apparatus for drying grain and similar material, consisting of the chamber for receiving the material to be dried, provided with suitable inlets for admitting air or steam directly into said chamber, and inclosed on the top or sides, or both, with a removable cover containing an absorbent material, substantially as described.

3. In a grain-drying apparatus, the combination of the chamber, having a funnel-shaped perforated bottom, and provided with steam and air pipes communicating with the space surrounding said bottom, and a receptacle holding an absorbent material adapted to serve as a cover or inclosure to the grain-chamber, substantially as described.

A. DE BEVOISE.
F. A. LUCKENBACH.

Witnesses:
JAMES M. TULLY,
JONATHAN MARSHALL.